Patented Aug. 2, 1949

2,477,812

UNITED STATES PATENT OFFICE 2,477,812

MICROBIOLOGICAL PRODUCTION OF RIBOFLAVIN

Abraham Leviton, Washington, D. C., assignor to United States of America as represented by the Secretary of Agriculture No Drawing. Application September 13, 1946,
Serial No. 696,959

3 Claims. (Cl. 195—42)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to the microbiological production of riboflavin by fermentation of carbohydrates with the organism *Clostridium acetobutylicum* and related strains, and has among its objects a process which increases the yield of the riboflavin.

In the fermentation process, a trace of ferrous iron is usually present. The iron may be derived from the use of iron equipment. It is known that the iron in certain amounts is desirable or necessary for proper utilization of carbohydrates in the process, but that the presence of the iron inhibits the production of the riboflavin, whence attempts have been made to regulate the amount of iron to a concentration to give good utilization of carbohydrates without, however, unduly inhibiting the production of the riboflavin, thus to obtain the most economical yield of the product.

According to the prior art processes, the amount of iron permissible to permit synthesis of a significant quantity of riboflavin is limited, in the range near 0.01 mg. atoms per l. of nutritive medium as the upper limit. With higher concentration of iron, more complete utilization of the carbohydrates may be obtained, but the quantity of riboflavin produced is not significant.

According to the present invention, it has been discovered that the addition of certain chemicals to the nutritive medium containing carbohydrates makes it possible to utilize a higher concentration of iron in the medium without inhibiting the production of the riboflavin or destroying it after its production, or to effect a much higher yield for a given concentration of the iron, thus to increase the yield based on the amount of carbohydrates employed.

Crystalline catalase (a specific enzyme for the decomposition of $H_2O_2$), sodium hydrosulfite, $Na_2S_2O_4$ (a reducing agent for $H_2O_2$), potassium iodide, KI, and yeast dialysate (which may be prepared from bakers yeast by autolysis with ethyl acetate, dialysis of the resulting suspension, and concentration of the resulting dialysate) are among the chemicals which may be used for the purpose, the yeast dialysate being preferably employed in combination with any of the others. Instead of yeast dialysate, the equivalent amount of yeast (1 cc. of dialysate equivalent to about .4 gm. yeast) may be used. The concentration of yeast dialysate should, in event of use by itself or in combination with the others, be a minimum of not less than about 1% of the medium, higher concentrations being permissible without deleterious effects. In event of the use of yeast dialysate alone, iron in concentrations over 0.01 and as high as about 0.03 mg. atoms per l. of medium may be present. In event yeast be used, the minimum concentration should be not less than about .4% of the medium. In event of the use of yeast dialysate in combination with the other chemicals, concentrations of the catalase and KI may vary respectively about from $2.8 \times 10^{-6}$ to $5.6 \times 10^{-6}$ (preferred, although the upper limit is not critical) and about from 0.03 to 0.60 millimol per l. of medium, with iron in concentration over 0.01 and up to about 0.03 mg. atoms per l., and concentration of the $Na_2S_2O_4$ may vary about from 0.03 to 0.15 millimol per l. with iron in concentration over 0.01 and up to about 0.04 mg. atoms per l.

To exhibit the invention in greater detail, a basal medium was prepared containing 0.5 gm. $KH_2PO_4$, 0.5 gm. $MgSO_4.7H_2O$, 0.3 gm.

$CaCl_2.2H_2O$ 2.0 gm. $(NH_4)_2SO_4$, 2.0 gm. asparagine, 30.0 gm. starch (on dry basis, $1 \times 10^{-6}$ gm. biotin, $50 \times 10^{-6}$ gm. para-aminobenzoic acid, 10 ml. yeast dialysate, traces of Mn, Zn and Mo, and 125 ml. of either M/5 sodium pyruvate or sodium butyrate buffer (pH 6.0) made up to 1 liter with water. 12.5 ml. portions of this basal medium were dispersed in anaerobic culture tubes, to which the chemicals under investigation and sufficient water to bring the volume in each tube to 15 ml. were added. The tubes were then sterilized by heating to 120° C. for 15 minutes and cooled.

The yeast dialysate was included in the basal medium described above in order to achieve a normal rate of fermentation, that is, to achieve a rate comparable to that obtained with a corn mash medium taken as a standard. Although its presence permits extension of the range of iron concentration, its influence on the synthesis is antagonized by an increase in iron concentration, and consequently by the use of the yeast dialysate with higher concentration of iron, the functions of other added chemicals may be studied, and at the same time normal rates of fermentation achieved.

Each sterilized and cooled tube described above was inoculated with the organism *Clostridium acetobutylicum* (Weizmann strain No. 4259), a 2% inoculum of cells in 5% corn mash being employed. The inoculum was derived by a series of transfers from a spore culture in corn mash, activated by a heat treatment at 100° C. for one minute. Transfers to the tubes were made after approximately 25% by weight of available gas had been evolved from the corn mash.

In most tests conducted, riboflavin was added to the medium for the purpose of determining whether the action of the iron was an inhibitory effect in the production of the riboflavin or a destructive effect on the riboflavin after its formation.

Experiments were run to determine the effect of varying amounts of iron in the absence of the chemicals other than the yeast dialysate, the results being shown in Table I.

*Table I*

| Fe, mg. atoms per l. medium | Riboflavin added, micromoles per l. | Total riboflavin recovered, micromoles per l. | Added riboflavin recovered, percent | Produced riboflavin recovered, micromoles per l. |
|---|---|---|---|---|
| 0.020 | none | 18.6 | none | 18.6 |
| 0.020 | 13.3 | 26.5 | 100 | 13.2 |
| 0.038 | none | 0.9 | none | 0.9 |
| 0.038 | 13.3 | 1.0 | 0.8 | 0.9 |

Table I shows that using yeast dialysate alone in the medium, iron in concentration of 0.038 mg. atoms per l. medium is about the upper limit allowable for the production of any riboflavin. At this concentration, substantially no riboflavin is produced and recovered. Also, substantially all added riboflavin is destroyed, thus indicating that at least with the higher concentrations of iron, the action of the iron is destruction of the riboflavin rather than inhibition of its formation.

In the following Table II, the tests being run to show the effects of the chemicals indicated, the medium used in each instance contained iron in concentration of .038 mg. atoms per l., and 13.3 micromoles of riboflavin per l. was added. The first item of the table compares to the last item of Table I.

*Table II*

| Chemical tested | | | Total riboflavin recovered, micromoles per l. | Added riboflavin recovered, per cent | Produced riboflavin recovered, micromoles per l. |
|---|---|---|---|---|---|
| Catalase, millimoles per l. | $Na_2S_2O_4$, millimoles per l. | KI, millimoles per l. | | | |
| none | none | none | 1.0 | 0.8 | 0.9 |
| $4 \times 10^{-4}$ | none | none | 9.6 | 66.0 | 0.9 |
| none | 0.1 | none | 10.0 | 69.0 | 0.9 |
| none | none | 0.1 | 10.0 | 69.0 | 0.9 |

Table II indicates that, under the concentrations of iron and riboflavin present and amounts of chemicals under test, substantially no produced riboflavin is recovered, but that the presence of the chemicals materially decreases the percentage of riboflavin destroyed. Also, the table indicates that the effects of the three chemicals under test are quite similar.

Table III shows more complete results with catalase and varying concentrations of iron, other factors being similar to those used in the experiments of Tables I and II, using sodium pyruvate buffer (pH 6.0) in the medium.

*Table III*

| Fe, mg. atoms per l. | Catalase millimoles per l. | Produced riboflavin recovered, micromoles per l. | Maximum rate of fermentation, gm. gas per l. per hr. evolved |
|---|---|---|---|
| 0.0200 | none | 18.8 | 0.19 |
| .0218 | none | 18.8 | .19 |
| .0254 | none | 11.7 | .30 |
| .0290 | none | 6.1 | .60 |
| .0344 | none | 1.6 | .70 |
| .0200 | $2.8 \times 10^{-4}$ | 40.0 | .50 |
| .0218 | $2.8 \times 10^{-4}$ | 43.9 | .70 |
| .0254 | $2.8 \times 10^{-4}$ | 35.0 | 1.00 |
| .0290 | $2.8 \times 10^{-4}$ | 27.9 | 1.00 |
| .0344 | $2.8 \times 10^{-4}$ | 1.3 | 1.00 |

Table III exhibits that in concentrations of iron ranging up to about 0.0300 mg. atoms per l. medium, the presence of catalase in the concentration indicated increases the yield of riboflavin about 250%. More catalase may be used than that indicated, but this will not substantially increase the riboflavin production.

Table IV shows more complete results with varying amounts of $Na_2S_2O_4$ and KI at 0.033 mg. atoms of iron per l. medium (near the critical concentration of the iron), the medium being similar to that used in the experiments of Table III, but using sodium butyrate buffer.

Table IV

| $Na_2S_2O_4$, millimoles per l. | KI, millimoles per l. | Produced riboflavin recovered, micromoles per l. | Maximum rate of fermentation, gm. gas per l. per hr. evolved |
|---|---|---|---|
| none | none | 2.1 | 0.22 |
| 0.028 | none | 5.3 | 0.60 |
| 0.142 | none | 4.8 | 0.22 |
| 0.570 | none | none | none |
| none | 0.03 | 1.3 | 1.3 |
| none | .15 | 1.3 | 1.3 |
| none | .60 | 1.1 | 1.1 |

Table IV indicates that at concentrations of iron at or near the critical point, high concentrations of $Na_2S_2O_4$ prevent the production and recovery of any riboflavin, but when used in lower concentrations, the yield of riboflavin is increased in an amount comparable to the 250% increase found with the use of catalase. Also, at these high concentrations of iron, KI actually contributes to the destructive action of the iron. In general, therefore, $Na_2S_2O_4$ in concentrations less than approximately 0.5 millimole per liter extends the range of iron concentration beyond 0.033 mg. atoms per liter. KI does not, however, share this effect with $Na_2S_2O_4$.

In addition to the chemicals above considered, it has been found that yeast dialysate also counteracts the destructive action of iron in the fermentation production of riboflavin. To exhibit this, a basal medium was prepared containing 0.5 gm. $KH_2PO_4$, 0.5 gm. $MgSO_4.7H_2O$, 0.3 gm. $CaCl_2.2H_2O$, 2.0 gm. $(NH_4)_2SO_4$, 2.0 gm. asparagine, 30.0 gm. lactose, $1.6 \times 10^{-3}$ gm. potassium iodide, 2.75 gm. sodium lactate, $1 \times 10^{-6}$ gm. biotin and $50 \times 10^{-6}$ gm. para-aminobenzoic acid made up to one liter with water.

Iron was added to the medium to give a total of 0.011 mg. atoms of iron per l., and inoculation was carried out in a manner similar to that before indicated. Without the addition of any yeast dialysate, no significant quantity of riboflavin was produced, but with the addition of 1% yeast dialysate (about .4% yeast), a yield of 40 micromoles of riboflavin per l. of medium was obtained. Even with much higher concentrations of iron (up to 0.03 mg. atoms per l.), similar yields result when the yeast dialysate is used.

Although the exact mechanism involved in the present invention is not known, it is believed that the riboflavin-destructive action of the iron in the fermentation process is due to the combined action of the iron and $H_2O_2$, as is more fully explained in an article by the present applicant, "Journal of the American Chemical Society," vol. 68, page 835, May 1946. Although no $H_2O_2$ can be detected in the ferment, this is probably due to its existence in the transitory state only. Riboflavin itself is quite stable in the presence either of iron solutions or of $H_2O_2$, but tests show that ferrous iron and $H_2O_2$ together are destructive of riboflavin. Furthermore, the tests show that the destructive action of riboflavin with $H_2O_2$ present (using riboflavin in aqueous solution with conditions of iron concentration and concentration of the various chemicals before mentioned comparable to the conditions in the fermentation process) parallels very closely the results obtained in the fermentation process.

With this understanding, it will be noted that catalase and $Na_2S_2O_4$ are quite similar in that they both decompose $H_2O_2$ to water and thus probably act to remove the $H_2O_2$ before it has opportunity together with the iron to destroy the riboflavin.

Spectrophotometric studies indicate that the action of $H_2O_2$ and Fe takes place at position 3 in the structural formula for riboflavin given below:

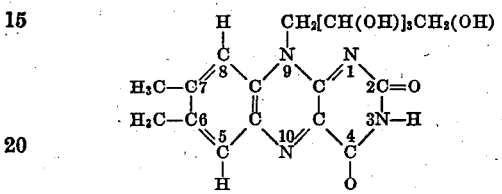

In the addition of KI to an aqueous solution containing riboflavin, position 3 is protected by the formation of complex salts, thus resulting in the stabilization of the riboflavin against the action of $H_2O_2$ and iron.

The function of the yeast dialysate appears to be that of a chemical which combines with the iron and in this way renders it unavailable for the destruction of riboflavin.

Having thus described the invention, what is claimed is:

1. In the microbiological production of riboflavin by fermentation with Clostridium acetobutylicum of a nutritive medium containing carbohydrates and iron, increasing the yield of riboflavin based on the amount of carbohydrates employed by adding to the nutritive medium yeast and catalase.

2. In the microbiological production of riboflavin by fermentation with Clostridium acetobutylicum of a nutritive medium containing carbohydrates and iron, increasing the yield of riboflavin based on the amount of carbohydrates employed by adding to the nutritive medium yeast.

3. In the microbiological production of riboflavin by fermentation with Clostridium acetobutylicum of a nutritive medium containing carbohydrates and iron, increasing the yield of riboflavin based on the amount of carbohydrates employed by adding to the nutritive medium catalase.

ABRAHAM LEVITON.

REFERENCES CITED

The following references are of record in the file of this patent:

UNITED STATES PATENTS

| Number | Name | Date |
|---|---|---|
| 2,370,177 | Legg | Feb. 27, 1945 |
| 2,425,280 | Hickey | Aug. 5, 1947 |

OTHER REFERENCES

Sumner et al., Enzymes, Academic Press (1943), pages 176 to 178, Book 513.5.

Leviton, J. A. C. S. 68, 5, May 1946, pp. 835 to 840.